United States Patent [19]

Sato et al.

[11] 4,233,485
[45] Nov. 11, 1980

[54] PROCESS FOR ELECTRICAL DISCHARGE MACHINING OF CYLINDRICAL WORK

[75] Inventors: Kunihiko Sato, Owari-Asahi; Tetsuro Urata; Tetsuhiro Asamoto, both of Nagoya; Kobun Asakawa, Fukuyama; Takeo Uebayashi, Fukuyama; Mitugi Kawano, Fukuyama, all of Japan

[73] Assignees: Mitsubishi Denki Kabushiki Kaisha; Nippon Kokan Kabushiki Kaisha, both of Tokyo, Japan

[21] Appl. No.: 920,989

[22] Filed: Jun. 30, 1978

[51] Int. Cl.³ ............................................. B23P 1/12
[52] U.S. Cl. .............................. 219/69 M; 219/69 V
[58] Field of Search ................ 219/69 R, 69 M, 69 V, 219/69 G

[56] References Cited

U.S. PATENT DOCUMENTS 3,878,353  4/1975  Anderson ........................ 219/69 M Primary Examiner—C. C. Shaw
Attorney, Agent, or Firm—Fleit & Jacobson

[57] ABSTRACT

Disclosed is a process for subjecting the outer surface of a satinizing roll to electrical discharge machining to produce, on the roll surface, a satin-like roughened surface with a uniform roughness. With the electrical discharge machining process, a plurality of electrodes of the same shape are mounted at equal pitches on each of a plurality of head columns, and the head columns are repeatedly reciprocally fed traversely along the axis of rotation of a roll over a predetermined distance which does not cause any stepped portions on the roll surface to effect the electrical discharge machining. The feeding of the electrodes toward the surface of the roll is separately controlled for each head column. To obtain the optimum working results, the head columns are repeatedly reciprocally fed traversely over a distance equal to the electrode mounting pitch.

5 Claims, 19 Drawing Figures

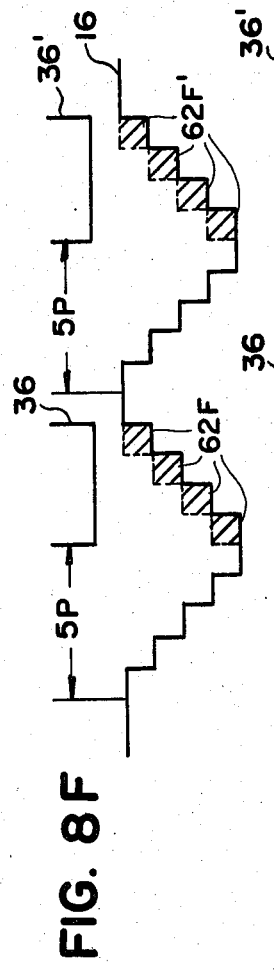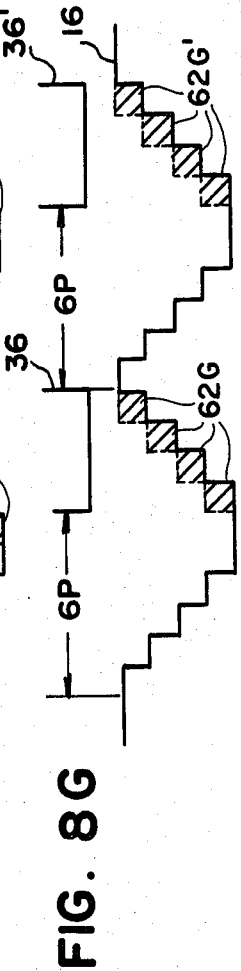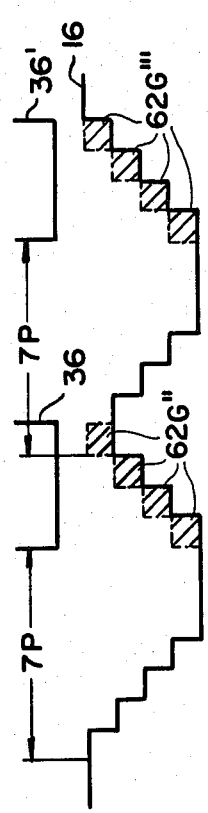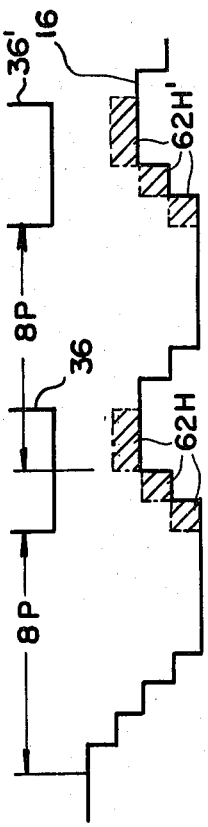
FIG. 8F   FIG. 8G   FIG. 8G'   FIG. 8H

PROCESS FOR ELECTRICAL DISCHARGE MACHINING OF CYLINDRICAL WORK

BACKGROUND OF THE INVENTION

The present invention relates to electrical discharge machining processes for cylindrical works of the type designed to give, by electrical discharge, a satiny finish of a predetermined surface roughness to the outer surface of a cylindrical work, and more particularly, the invention relates to an electrical discharge machining process capable of preventing the occurrence of a stepped portion on the boundary portion between the working areas of the adjacent electrodes due to the difference in the number of passages of electrodes between the electrodes during the electrical discharge machining.

In the past, the method of throwing hard metal particles, e.g., shot or grit, at the polished surface of strip rolling rolls, particularly cold rolling rolls or the like, to produce impressions on the roll surface, has been used as a means of giving a satin-like finish to the surface of such roll, and recently attempts have been made to replace this type of process by electrical discharge machining. As is well known, electrical discharge machining is a process in which an insulating liquid such as kerosene is placed in a small discharge gap between an electrode and a work piece and a pulse wave voltage is applied periodically across the electrode and the work piece, thus machining the surface of the work piece. By repeatedly performing this electrical discharge machining at the surface of a roll while rotating the roll in the circumferential direction and also gradually moving the electrode along the axis of rotation of the roll, it is possible to continuously give a spiral satiny finish to the roll surface, and thereby to produce spark eroded impressions all over the roll surface. This is the known method of giving a uniform satiny finish to the surface of a roll. The satin finish produced in this way has many advantages; that is, not only is the surface roughness more marked and the shape in excellent trim as compared with the mechanical impressions produced by the throwing of metal particles, but also the shape is not affected by the manufacturing method, hardness, etc., of the roll, the metal structure in the roll surface being hardened by the electrical discharge, thus making the roll best suited for rolling purposes and so on.

Also in the past, an electrical discharge dull finishing process has been proposed in which a roll is rotated at a constant speed and a head column (a head and a column are considered as a unit and the unit is hereinafter referred to as a head column) having an electrode is traversely fed repeatedly by an amount equal to the working width of the roll along its axis of rotation. However, this method has the disadvantage of requiring an exceedingly large working time and there is also an inconvenience that the method cannot, as such, be put to practical use.

As a result, more recently, electrical discharge dull finishing processes have been proposed in which a multi-piece electrode is used to reduce the working time. However, the processes which have been proposed so far are so designed that a roll is rotated at a constant speed and split electrodes are very inacurately fed transversely to thereby give a desired finish to the entire roll surface, and consequently the measures taken to deal with the difficulty at the boundary portions between the working areas of the electrodes are extremely inadequate. Actual operations performed with this type of process showed that very small steps or stepped portions were produced on the boundary portions. While the experiment also showed that the magnitude of such steps was very small, i.e., on the order of several microns in the case of a surface roughness of 18 $\mu Rz$, when the thusly dull finished roll is used actually in the final rolling of sheet steel, the effect of such steps cannot be ignored, and the rolled sheet steel products will be rejected.

The cause of such steps is the fact that an inacurate transverse feeding of the electrodes causes a difference in the number of passages of electrodes between the boundary portion of the working areas and other portions, and consequently the depth of spark erosion is not the same at all the portions.

SUMMARY OF THE INVENTION

The present invention has been made to overcome the problem of stepped portions caused on the outer peripheral surface of a roll during the satin finishing of the same by electrical discharge machining.

It is therefore an object of the present invention to provide an electrical discharge machining process in which a plurality of split electrodes of the same shape are mounted on each of a plurality of head columns at equal pitches, and the head columns are repeatedly reciprocally fed traversely over a distance so that a difference in the number of passage of electrodes between the boundary portion of the working areas of the adjacent electrodes and other portions becomes less than a predetermined number causing a stepped portion.

It is another object of the invention to provide such an electrical discharge machining process in which the machining is effected by accurately repeatedly reciprocately feeding the head columns traversely over a distance corresponding to the pitch in accordance with which the split electrodes are mounted.

Other features and advantages of the invention will be apparent from the following description taken in connection with the accompanying drawings.

BRIEF DESCRIPTION OF THE DRAWINGS

FIGS. 8A to 8K are diagrams showing the changes with time in the surface condition of the roll for every electrode feed pitch, which were produced by traversely feeding a pair of electrodes in one direction only.

DESCRIPTION OF THE PREFERRED EMBODIMENTS

Figure 1:
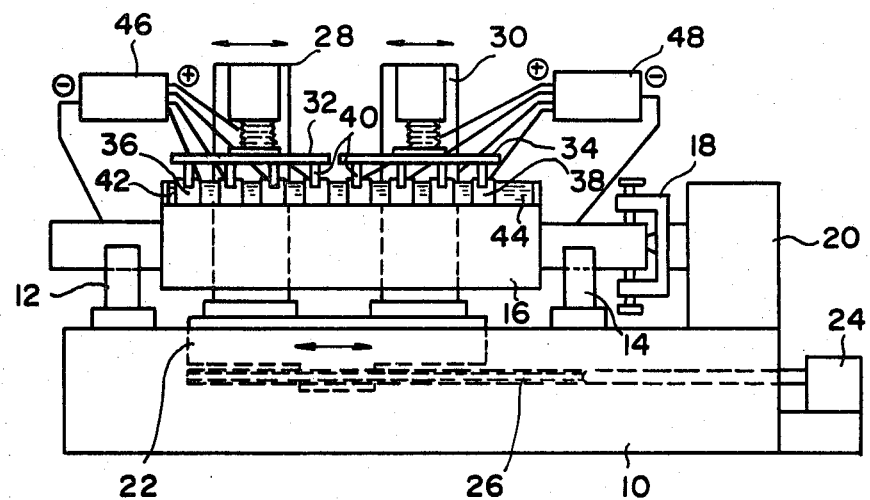
FIG. 1 is a schematic diagram showing an embodiment of an electrical discharge machining apparatus for performing an electrical discharge machining process according to the invention.

Referring to FIG. 1, there is illustrated an embodiment of an apparatus for performing a process according to the invention, which includes a pair of head columns that will be described later.

In the Figure, numeral 10 is a bed, 12 and 14 bearings mounted on the bed 10, 16 a work piece or roll supported in a horizontal position by the bearings 12 and 14, 18 a dog for chucking one end of the roll 16, and 20 a roll driving unit mounted on the bed 10 to rotate the dog 18 and thereby to rotate the roll 16. Numeral 22 designates a base holder adapted to be slidable over the bed 10 from side to side in the Figure by the action of a feed screw 26 of a column traverse feed drive unit 24. Numerals 28 and 30 designate head columns fixedly positioned on the base 22, 32 and 34 electrode holders mounted on the head columns 28 and 30, respectively, 36 and 38 electrodes mounted at equal pitches through insulating plates 40 on the holders 32 and 34, respectively, with the electrodes 36 and 38 being disposed to face the roll 16 with a predetermined gap therebetween and each made of a copper plate 50 of the same shape as shown in the perspective view of FIG. 2. Numeral 42 designates a working tank held in place above the roll 16, 44 a working liquid which is supplied into the working tanks 42 by a pump which is not shown. It is so arranged that the working liquid 44 overflown from the working tank 42 is filtered and then returned to the working tank 42. Numerals 46 and 48 designate pulse source units connected to respectively cause discharge between the electrodes 36 and 38 and the roll 16. In the Figure, while the pulse source units 46 and 48 have their positive terminals connected to the electrodes 36 and 38, respectively, and their negative terminals connected to the roll 16, the desired operation can also be effected by connecting the units in the reverse manner. The feeding of the spindles of the electrodes 36 and 38 in a direction perpendicular to the working surface of the roll 16, is effected separately for each of the head columns 28 and 30.

Figure 2:
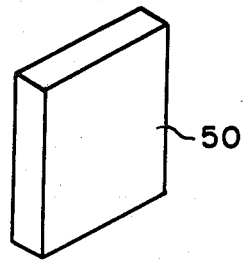
FIG. 2 is an enlarged perspective view of the electrodes used with the apparatus of FIG. 1.

FIG. 2 shows one of the electrodes 36 and 38 respectively mounted at equal spacing on the head columns 28 and 30 in the apparatus of FIG. 1, and an electrode piece 50 is a rectangular electrode having a thickness t and an electrode width L.

The electrical discharge machining process according to the invention will now be described with reference to FIG. 1.

Figure 3:
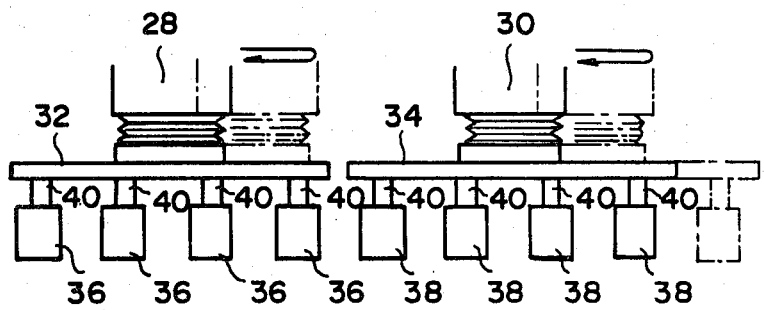
FIG. 3 is a partial schematic diagram of the apparatus of FIG. 1, which diagram is useful in explaining the manner of traversely feeding the head columns according to the electrical discharge machining process of this invention.

Firstly, the electrodes 36 and 38 are respectively accurately mounted on the electrode holders 32 and 34 at equal electrode mounting pitches corresponding to the working width of the roll 16. Next, the working liquid 44 is supplied into the working tank 42 and the roll 16 is rotated at a constant speed by the roll driving unit 20. Then, the spindle feed of the head columns 28 and 30, respectively, is controlled to adjust the discharge gap between the electrodes 36 and 38 and the roll 16 in such a manner than when a voltage pulse is applied to the electrodes 36 and 38 from the pulse source units 46 and 48, the electrodes 36 and 38 on the head columns 28 and 30 simultaneously initiate the electrical discharge machining. Simultaneously with the initiation of the machining, the column transverse feed drive unit 24 repeatedly reciprocally feeds the head columns 28 and 30 traversely exactly over a distance corresponding to the electrode mounting pitch as shown in FIG. 3, thus performing the machining of the roll 16. The results of the actual machining of the rolls made in this way have shown that, practically speaking, there was no occurrence of steps at the boundary portions insofar as the worked roll surfaces were examined by rubbing the surfaces with an oil-stone.

Figure 4:
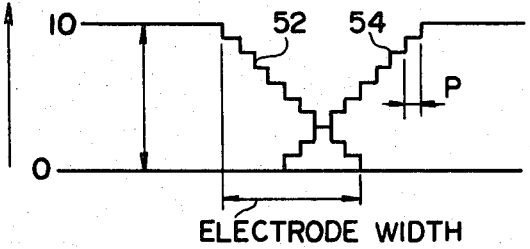
FIG. 4 is a graph showing the number of passages of electrodes at the boundary portion of the working areas of the adjacent electrodes in cases where the electrode transverse feed stroke is less than the electrode mounting pitch.

Next, how the process of this invention can eliminate the occurrence of steps at the boundary portions of the working areas will be described. FIG. 4 shows results obtained with a known process employing split electrodes, particularly showing diagramatically the conditions at the boundary portion of the working areas of the adjacent split electrodes obtained when the distance of electrode transverse feed was less than the electrode mounting pitch.

Figure 5:
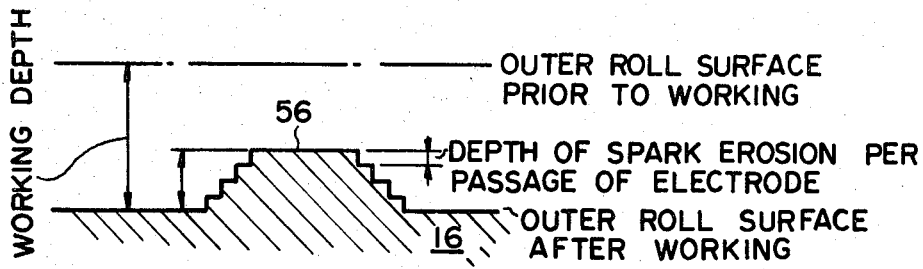
FIG. 5 is a diagram useful for explaining the steps produced on the surface of the boundary of the roll working areas due to a difference in the number of passages of electrodes.

As a result, as shown in FIG. 5, due to an insufficient depth of spark erosion, a raised portion or projection 56 was produced on the outer surface of the worked roll 16 where the number of passages of electrode was relatively small, thus causing a stepped portion at the boundary portion. FIGS. 4 and 5 show the results obtained by transversely feeding the electrodes in one direction only.

Similarly, when the distance of electrode transverse feed is selected greater than the electrode mounting pitch, the number of passages of electrodes at a portion of the boundary area will be greater than that at the other portions, and consequently, contrary to the projection 56 of FIG. 5, there occurs a hollow having a deeper depth of spark erosion than the outer surface of the worked roll, thus similarly causing a stepped portion.

The results of the actual operations, performed at the roll circumferential speed of 6 m/min to obtain a satin-finished roll surface roughness $Rz=18\mu$, showed that a stepped portion was caused on the roll surface when the difference in the number of passages of electrodes at the boundary portion of the working areas was more than 4. Thus, in accordance with the electrical discharge machining process of this invention, the occurrence of stepped portions on the roll surface is prevented by controlling the distance of electrode traverse feed in relation to the electrode mounting pitch in such a manner that the difference in the number of passages of electrodes is less than that which would cause a stepped portion at the boundary portion of the working areas of the adjacent electrodes.

Figure 6:
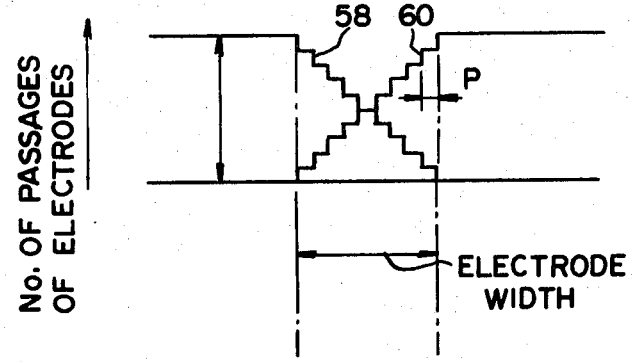
FIG. 6 is a graph showing the number of passages of electrodes at the boundary portion of the working areas of the adjacent electrodes obtained with the electrical discharge machining process of this invention in which the electrode transverse feed stroke is selected equal to the electrode mounting pitch.

In accordance with the most preferred embodiment of the electrical discharge machining process of this invention, the distance of electrode transverse feed is selected equal to the electrode mounting pitch. FIG. 6 is a graph in which the number of passages of electrodes at the boundary portion of the working areas of the adjacent electrodes was obtained as in the case of FIG. 4, in accordance with the process of this invention, in which the distance of electrode transverse feed is selected equal to the electrode mounting pitch. As will be seen from the Figure, the number of passages is the same at all portions of the boundary area, and no stepped portion is caused on the outer surface of the worked roll, as will be seen from FIG. 7.

With this most preferred embodiment, however, it is essential that the electrodes are traversely fed over a distance exactly equal to the electrode mounting pitch. If the distance of electrode traverse feed is not equal to the electrode mounting pitch, there is the danger of causing stepped portions. As a result, in accordance with the process of this invention, as mentioned previously, the head columns are repeatedly reciprocally fed traversely by controlling the distance of electrode transverse feed in such a manner that the difference in the number of passages at the boundary portion does not exceed a minimum value which causes a stepped portion.

Figure 7:
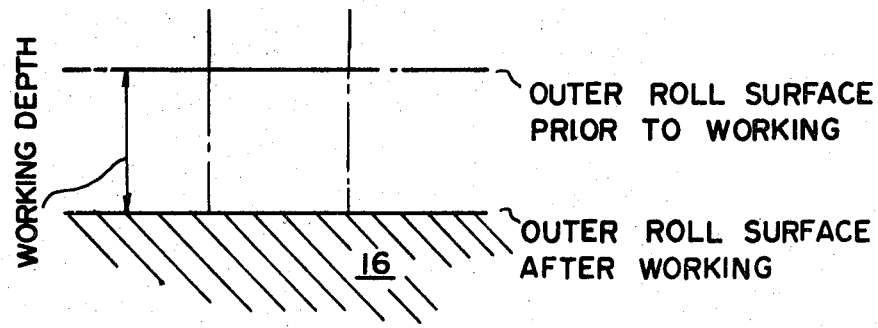
FIG. 7 is a diagram showing the surface condition of the boundary portion of the roll working areas obtained by using the number of passages of electrodes shown in FIG. 6.

In order to facilitate understanding of the function and effects of the present invention, FIGS. 8A to 8J show the surface conditions corresponding to the respective transverse feeds which were obtained by subjecting a roll 16 to electrical discharge machining by successively traversely feeding a pair of adjoining electrodes 36 only to the right (we take this instance merely for the sake of convenience of explanation), and the graphs of FIGS. 5 and 7 were obtained through the similar developments as shown in FIGS. 8A to 8J.

By the way, it will be needless to say that the outer surface of roll 16 shall be finished even if a plurality of electrodes 36 and 38 are provided throughout the whole length of roll 16 as shown in FIG. 1.

Figure 8A:
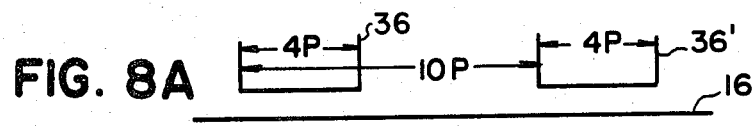
Figure 8B:
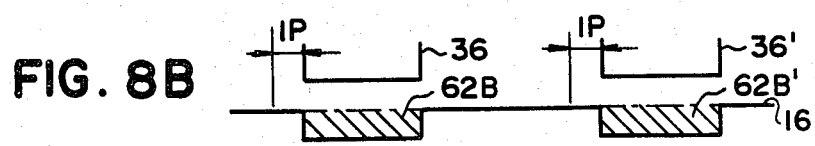
Figure 8C:
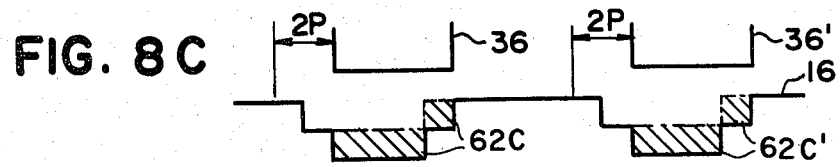
Figure 8D:
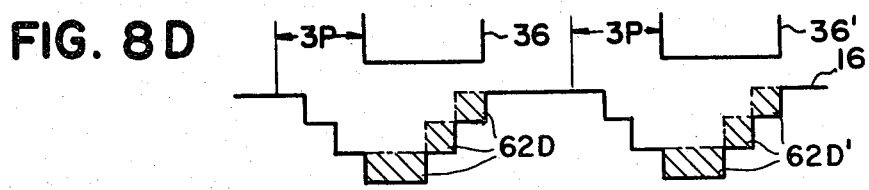
Figure 8E:
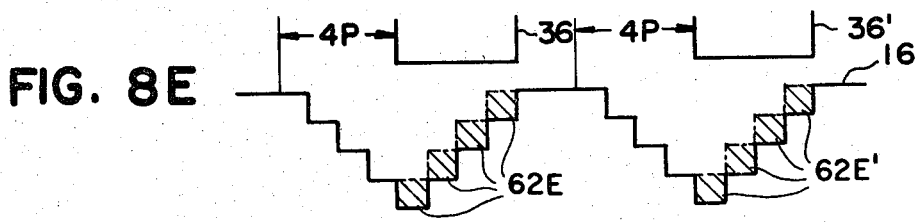
Figure 8I:
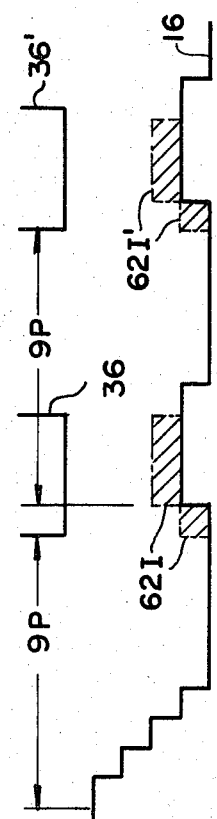
Figure 8J:
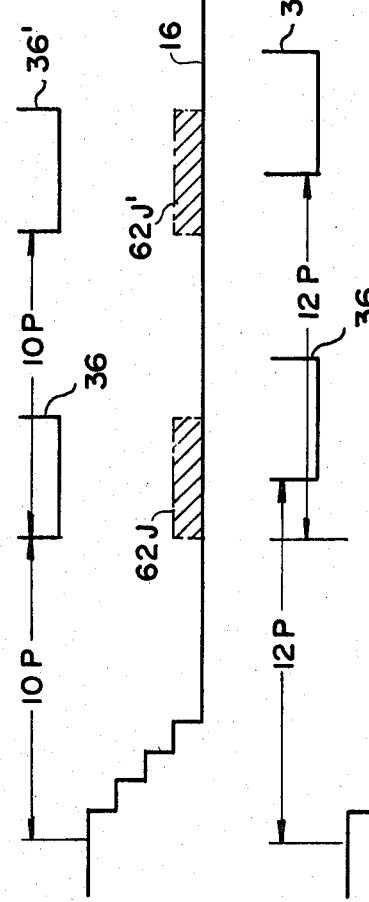

Firstly, in the condition of FIG. 8A, showing that the electrical discharge machining has not started as yet, if the electrode traverse feed pitch corresponding to the feed pitch of the feed screw 26 shown in FIG. 1 is P mm, then the electrode width of each electrode 36 and 36' will be 4P, and the pair of electrodes 36 and 36' will be mounted at a spacing of 10P. In operation, when discharge is started and the electrodes 36 and 36' are fed traversely 1P mm to the right, as shown in FIG. 8B, hatched portions 62B and 62B' of the roll 16 facing the electrodes 36 and 36' are machined and removed. Then, when the electrodes 36 and 36' are traversely fed 2P mm to the right, as shown in FIG. 8C, the depth of spark erosion is increased further as shown by the hatched portions 62C and 62C', and the depth of spark erosion increases in increment (step by step) with increases in the number of pitches of the transverse feed as shown by hatched portions 62D, 62D', 62E and 62E' in FIGS. 8D to 8E. When the number of electrode transverse feed pitches reaches 5P, thus exceeding the length of 4P corresponding to the electrode width, as shown in FIG. 8F, the depth of spark erosion becomes constant as shown by hatched portions 62F and 62F'; when the transverse feed pitches are further increased to 6P, the hatched portions 62G and 62G' are machined as shown in FIG. 8G; when said transverse feed pitches reach 7P as shown in FIG. 8G', the top of the unworked portion at the boundary of the working areas machined as shown by the hatched portions 62G" and 62G'''; when said transverse feed pitches are further increased to 8P and 9P, the hatched portions 62H and 62H' in FIG. 8H and the hatched portions 62I and 62I' in FIG. 8I are respectively machined; and, finally, when the electrode is fed transversely 10P, corresponding to the electrode mounting spacing, the worked roll surface, namely, the boundary portion of the areas worked by the pair of electrodes, is machined to the same depth of spark erosion as the other portions, thus producing no stepped portion, as shown in FIG. 8J. While FIGS. 8A to 8J show a case in which the pair of electrodes 36 and 36' was used, thus leaving an unworked portion at each roll end, in the case of an actual apparatus, a plurality of electrodes will be arranged at equal pitches along the entire roll axis, and consequently there is no danger of causing any stepped portion on the outer surface of the worked roll insofar as the distance of electrode transverse feed is selected equal to the electrode mounting pitch. In this case, the conditions shown in FIGS. 8B to 8I correspond to those of the prior art process shown in FIGS. 4 and 5 since the distance of electrode transverse feed is less than the electrode mounting pitch of 10P, and the condition in FIG. 8J corresponds to the electrical discharge machining process of the present invention in which the distance of electrode transverse feed is selected equal to the electrode mounting pitch.

Figure 8K:
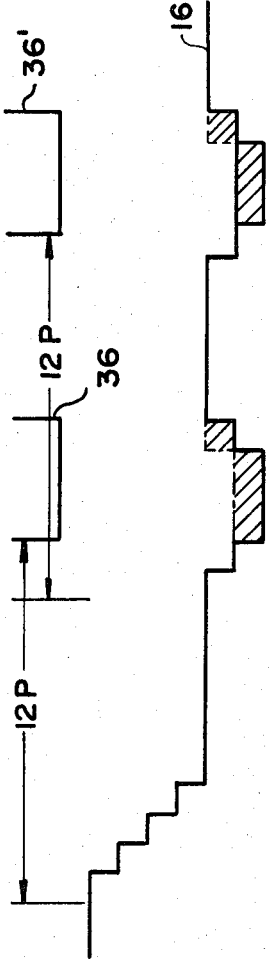

Further, when the transverse feed of the electrodes 36 and 36' reaches 12P, that is, the electrodes 36 and 36' are traversely fed in excess of the electrode mounting pitch of 10P as shown in FIG. 8K, apparently a hollow portion of a deeper depth of spark erosion than other worked areas is produced on the boundary portion of the working areas.

While, in the embodiment described above, the head columns are repeatedly reciprocally fed traversely over a distance corresponding to the electrode mounting pitch, if the working conditions or the transverse feed speed of the head columns is so selected that the desired satin finished surface roughness Rz can be obtained by a single transverse feed of the head columns, the desired machining can be completed by traversely feeding the electrodes only once over a distance corresponding to the electrode pitch mounting pitch.

It will thus be seen from the foregoing that, in accordance with the present invention, there is thus provided an improved electrical discharge machining process for cylindrical works, which method is capable of eliminating the occurrence of a step or difference in depth of spark erosion at the boundary portion of the working areas of split electrodes, a condition which has heretofore been a problem in the machining of cylindrical works by the split electrodes, and the process of this invention has a great advantage of producing high precision worked roll surfaces while ensuring increased working speed.

What is claimed is:

1. In an electrical discharge machining process for giving a satiny finish to the outer surface of a cylindrical work, wherein a plurality of head columns is disposed with a predetermined interval between adjacent head columns, each of said head columns having mounted thereon a plurality of electrodes arranged at an equal pitch to face the cylindrical work rotated at a constant speed, the improvement comprising the steps of:
   controlling the feeding of said electrodes toward the working surface of said cylindrical work separately for each of the head columns; and
   reciprocally and continuously feeding said head columns transversely at a constant speed over a distance equal to the mounting pitch of said electrodes along the axis of rotation of said cylindrical work.

2. In the process according to claim 1, comprising the additional steps of setting electrical discharge machining conditions so as to give a desired satin-finished surface roughness to the outer surface of said cylindrical work by a single passage of said plurality of electrodes, and feeding said head column transversely at a predetermined low speed determined by said working conditions in one direction only over a distance equal to the mounting pitch of said electrodes along the axis of rotation of said cylindrical work, whereby to complete the machining of said work.

3. In the process according to claim 1, comprising disposing split electrodes so as not to overlap each other with respect to the direction of rotation of said cylindrical work.

4. In the process according to claim 1, comprising the additional steps, before the controlling step, of:
   providing pulse source units of the same number as the number of said plurality of head columns for applying current to the groups of electrodes of the corresponding head columns; and
   disposing said split electrodes so as not to overlap each other with respect to the direction of rotation of said cylindrical work.

5. In the process according to claim 4, comprising the additional steps of setting electrical discharge machining conditions so as to give a desired satin-finished surface roughness to the outer surface of said cylindrical work by a single passage of said plurality of electrodes, and feeding said head column transversely at a predetermined low speed determined by said working conditions in one direction only over a distance equal to the mounting pitch of said electrodes along the axis of rotation of said cylindrical work, whereby to complete the machining of said work.

* * * * *